United States Patent [19]
Phillips et al.

[11] 3,864,646
[45] Feb. 4, 1975

[54] CO CHEMICAL LASER FROM KETENE GAS

[75] Inventors: David C. Phillips; Nathan T. Melamed, both of Pittsburgh, Pa.

[73] Assignee: Westinghouse Electric Corporation, Pittsburgh, Pa.

[22] Filed: June 22, 1973

[21] Appl. No.: 372,723

[52] U.S. Cl.......... 331/94.5 G, 330/4.3, 331/94.5 C
[51] Int. Cl............................................. H01s 3/22
[58] Field of Search...................... 331/94.5; 330/4.3

[56] References Cited
OTHER PUBLICATIONS
Boney et al, IEEE Journal of Quantum Electronics, Vol. 9, no. 2, pp. 246–247 QC 447 I2.

Primary Examiner—William L. Sikes
Assistant Examiner—R. J. Webster
Attorney, Agent, or Firm—D. P. Cillo

[57] ABSTRACT

A CO chemical laser, capable of producing stimulated laser emission having a wavelength between about 4.7 and about 5.9 microns, contains an enclosed optical resonant laser cavity containing $CH_2CO$ gas and means for supplying excitation energy to the $CH_2CO$ gas to form an active laser medium comprising vibrationally excited CO molecules.

10 Claims, 3 Drawing Figures

CO CHEMICAL LASER FROM KETENE GAS

BACKGROUND OF THE INVENTION

The CO laser is one of the most important gas lasers currently being developed. Its importance is due in part to its low collisional deexcitation rates, permitting high power, high pressure operation, and its useful wavelength of about 5 microns. The CO chemical laser has the further very important potential advantages of being portable and independent of external power sources.

At the present time, the CO chemical lasers which have been developed suffer from low efficiencies among other difficulties. The CO electric discharge lasers must usually be operated at cryogenic temperatures. The most important prior art CO chemical laser emission is produced by an oxidation reaction between $CS_2$ and $O_2$. This CO laser emission was first discovered by Pollock, APPLIED PHYSICS LETTERS, 8:238 (1966). The reaction occurs in several steps. The CS radical is initially created in the reaction:

$CS_2 + O \rightarrow CS + SO$ The central reaction in this laser is oxidation of the CS radical:

$CS + O \rightarrow CO^* + S + 75$ kcal/mole where CO* refers to a vibrationally excited molecule. The overall reaction may be written as:

$CS_2 + 2½O_2 \rightarrow CO^* + 2SO_2$

The $CS_2$ laser has been excited using flash photolysis. Electrical discharges have also been used. In this latter case, the atomic oxygen may be generated by an auxiliary discharge and mixed with the other reactants, or it may be generated along with other radicals by a discharge in the premixed reactants.

There are several disadvantages to the $CS_2 + O_2$ reaction. Assuming complete combustion of the $Cs_2$, the volumetric efficiency of CO production is quite low. Thus, 3 ½ molecules of initial reactants are necessary to produce one molecule of CO*. In actual practice, free sulfur and other solid products can form, and an excess of oxygen may be required to minimize the amount of solid residue. Fouling of optical components in the laser generator by these solid deposits is disadvantageous and can be a very serious problem. In addition, unless there are chemical sources of additional atomic oxygen, the reactions may terminate soon after the discharge is discontinued. Spectroscopic evidence indicates that the CO* molecules are initially formed in vibrational states where the vibrational band $v$ is approximately 10 to 12. Experiments with flash photolysis indicate, however, that only one photon of laser output is obtained for every seven molecules of $CS_2$. The overall internal chemical to laser quantum efficiency is therefore only about 1 percent.

Another CO chemical laser which has many similar problems is taught by Barry et al in U.S. Pat. No. 3,704,428, where CO* is formed by the reaction:

$2CH_4 + 3O_2 \rightarrow 2CO^* + 4H_2O$ with the formation of $NH_4NO_3$ foulant on the tube walls presenting a hazard if the laser is restarted, and the generation of water vapor. The present invention is intended to overcome many of the difficulties of present CO lasers by means of a novel class of chemical decomposition reactions which produce laser gas and essentially no solid residues.

SUMMARY OF THE INVENTION

A CO chemical laser, that is operable in pulsed, Q-switched, and continuous wave mode, forms vibrationally excited CO molecules by means of the enclosed decomposition of ketene gas within an optical resonant cavity.

BRIEF DESCRIPTION OF THE DRAWINGS

For a better understanding of the invention, reference may be made to the preferred embodiments, exemplary of the invention shown in the accompanying drawings in which.

DESCRIPTION OF THE PREFERRED EMBODIMENTS

Figure 1:
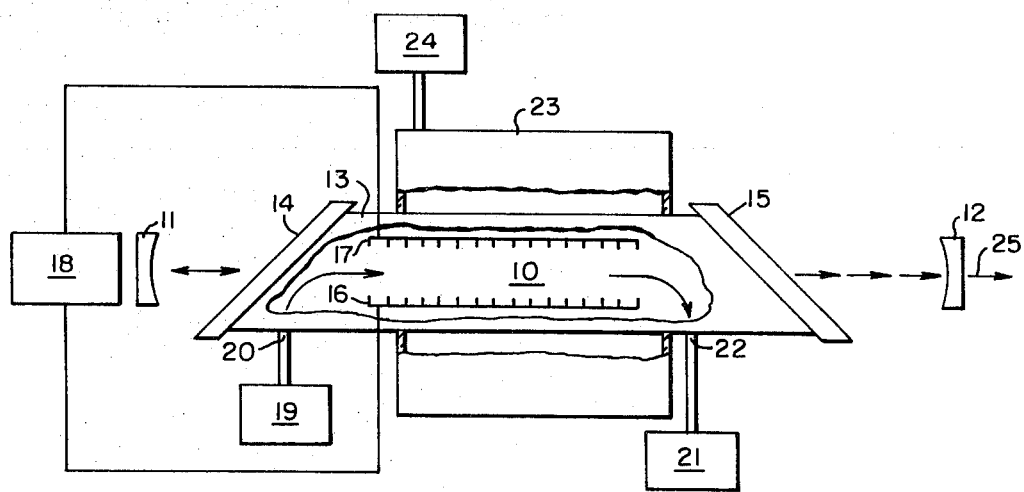
FIG. 1 shows one embodiment of the laser of this invention, having a single lasing chamber and operating in the continuous wave mode.

The present invention provides a CO chemical laser by means of the cleavage decomposition of ketene. Ketene is an unsaturated compound of the type $H_2C=C=O$, in which the same carbonation is involved in both a carbonyl and an ethylenic double bond. While ketone is highly exothermic due to the nature of its decomposition, it is a moderately stable compound at room temperature. Other properties are that it is a colorless gas with a boiling point of $-56°C$ and a melting point of $-151°C$; it can be readily and cheaply prepared by the pyrolysis of acetic acid or acetone; and it can be readily stored as a liquid at dry ice temperatures. It may be kept for many weeks with little or no deterioration, or it may be prepared in situ as needed.

The flash lamp photolysis of ketene has been carefully studied. There exists two broad spectral photolytic absorption bands. One of these extends from about 3800 to 2400 A, with a broad maximum at 3150 A, and a second begins at 2400 A and has a peak at 2130 A. The photolytic decomposition reaction of ketene proceeds in two steps. For each photon of light energy absorbed, two CO molecules are produced in the following manner:

$CH_2CO^{h\nu} \rightarrow CH_2: + CO^* + 100$ Kcal/mole (approx.)
$CH_2: + CH_2CO \rightarrow C_2H_4 + CO^*$ where $CH_2:$ refers to the methylene diradical, CO* refers to a vibrationally excited laser gas molecule and $C_2H_4$ is a reaction product gas.

A considerable amount of energy is released, and the reaction proceeds very rapidly in times of the order of a millisecond or less. Numerous measurements of the quantum yield of CO* for the photolytic reaction indicate it to be slightly greater than 2. However, under certain conditions using short flashlamp pulses of very high intensities, quantum yields of over 6 are obtained by irradiating into the shorter wavelength band. Under the latter conditions the dissociation proceeds by a different route.

The decomposition of ketene is very exothermic. The energy released is approximately 100 kcal mole$^{-1}$ of ketene. A considerable effort has gone into determining the fraction of this energy which appears on the methylene diradical. This number is quite uncertain, but appears to be about 32 kcal mole$^{-1}$. Little is known of the energy which appears on the CO* molecule, but because of the extreme exothermicity of the decomposition a certain fraction of the released energy does go to produce excited CO molecules which are suitable as a lasing gas medium. Since the vibrational levels of CO* are separated by only 0.2 eV (4.6 kcal/mole) there is ample energy to produce excited CO molecules.

The decomposition of ketene ($CH_2:C:O$) in a laser generator may be initiated in various ways, such as: photolytic - by the absorption of photons of the appropriate frequency from a light source such as a Mercury, Xenon or other suitable flashlamp which provides pump energy; electrical - by an electric discharge or spark; nuclear - by neutrons or fission fragments or both and thermal - by heating either locally or raising the overall temperature.

The decomposition of ketene for laser applications may be performed in the pure $CH_2CO$ gaseous state but is preferably performed in a mixture containing other selected gases. The amount of ketene that is present in the laser system must be in an amount effective to provide gain. This means that during decomposition, a sufficient amount of active CO* must be created so that the optical gain due to the CO* molecules at the desired wavelength is at least sufficient to overcome the losses in the laser. The amount of ketene that is required therefore depends on the way in which the laser is operated, the amount of loss present, and on the presence of other gases. Theoretically, the amount of ketene required could be as low as several molecules in a suitable gas mixture. The useful partial pressure of ketene is in the range of about 0.1 to 760 Torr.

Excessively high pressures of ketene could have undesirable effects on the laser action because ketene may collisionally deexcite CO* molecules. In order to reduce the deexcitation of CO* by ketene, and to lower the temperature of superexcited CO* molecules, it is desirable to add a buffer gas up to about 99 volume percent of the gas mixture.

The buffer gas does not directly participate in the laser action, but serves as an inert diluent. One of its functions is to reduce the likelihood of undesirable collisions, such as CO* with CO* or with ketene from occurring. An ideal buffer gas is one which can collide with a CO* molecule without deexciting it or changing its vibrational state of excitation. The use of buffer gases is well known in the art of chemical and gas lasers. Suitable buffer gases are such gases as $SF_6$, He, Ne, Ar, Kr and Xe, alone or in mixtures. A preferred amount of buffer gas would be about 20 to about 100 Torr in mixture with about 2 to 5 Torr of ketene. Desirable other gases are $O_2$ and $SO_2$ in amounts up to about 4 Torr alone or as a mixture, and preferably between about 0.2 to about 1 Torr. The $O_2$ and $SO_2$ are active electronegative gases which improve the lasing action of the system. $O_2$ is useful, within the above ranges, in this system, as a scavenger gas for the methylene diradical. The use of $O_2$ over about 4 Torr may result in formation of $CO_2$ with resultant loss of efficiency in the system.

Gases which are effective in causing collisional deexcitation of the CO* vibrational levels are generally not suitable as buffer gases. Examples of such undesirable gases are $SO_2$ and $O_2$, in amounts above about 4 Torr, $CO_2$, water vapor and high molecular weight organic gases such as, for example propane and butane.

Although appreciable power outputs with reasonable efficiencies can be obtained in room temperature operation of these CO lasers, generally, cooling the laser gas to lower temperatures improves laser performance. This is based on the fact that as the gas temperature increases, the rate of energy loss from excited vibrational states by way of collisions with other species increases. The recycle of exhausted and cooled CO into the mixture of gases used in this invention would be one way to improve laser efficiency by cooling the ketene and providing additional CO*. Temperatures within the range of about 150°K to 400°K should be used in operating the CO laser of this invention, along with partial pressures of ketene within the range of about 0.1 Torr to 760 Torr.

In comparing the ketene reactions of this invention with those involving $CS_2$ and $O_2$, a number of features emerge: The volumetric efficiency i.e., the molecules of CO* formed for each molecule of starting material can be closer to unity, and is therefore considerably greater for ketene than for the $CS_2-O_2$ mixture; thus much less stored starting gas is required for each molecule of CO* to be produced. The chemicals produced as a result of the ketene decomposition consist almost entirely of $C_2H_4$ and CO* gases with substantially no solid residue. These are clean and easily disposed gases in contrast to the $CS_2-O_2$ reaction, where a much greater possibility exists of forming solid residues. The quantum yield for photolysis is 2 or greater as compared to below 1 for the $CS_2-O_2$ reaction, with broad absorption bands available in a region of the spectrum readily accessible by conventional flash lamps. The ketene reaction proceeds extremely rapidly, insuring a rapid buildup of a population inversion. Such a rapid buildup can overcome deexcitation effects and produce a high laser efficiency.

Either pulsed or continuous wave operation is possible in this invention by continuous photolysis, electric discharge, or other means of reaction initiation. Q-switching may be accomplished by one of several means, such as rotating one of the resonator mirrors. Bleachable filters or electro-optic Q-switches may be used for Q-switching with suitable materials that are known and available. Single frequency operation may be obtained by the use of a suitable grating within the laser cavity. Single frequency operation may also be used in conjunction with Q-switching if desired.

Figure 2:
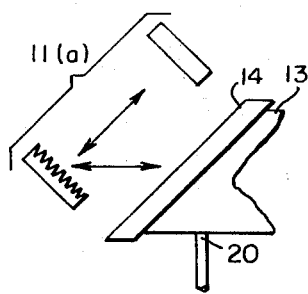
FIG. 2 shows the laser of this invention utilizing a grating-mirror combination.
Figure 3:
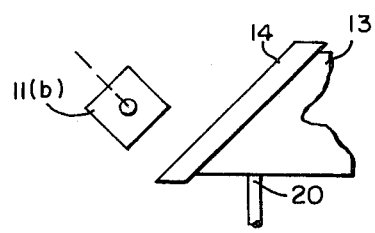
FIG. 3 shows the laser of this invention utilizing a Q-switching means.

Referring now to FIG. 1, a simple schematic illustration of one embodiment of a chemical laser generator is shown. The components of physical hardware used in fabricating the structural embodiments of the invention are generally well known in the laser art and described in U.S. Pat. No. 3,704,428 herein incorporated by reference. An enclosed optical resonant laser cavity 10 is formed between fixed highly reflective concave mirror 11 and opposite parallel fixed partially reflecting concave transmission mirror 12. Reflective means 11 should be about 99 percent reflective while reflective means 12 should be about 50 percent reflective, although this percentage depends upon the geometry of the cavity, the gain of the gas medium and the conditions of use. In other embodiments of the invention, the fixed concave mirror 11 can be substituted for by a movable diffraction grating such as a Littrow replica grating with, for example about 100 lines per mm and blazed at about 15° for 5.18 microns, or by diffraction grating-mirror combination 11 (*a*), shown in FIG. 2, to provide continuous wave single-line operation; or a conventional Q-switch mirror or other suitable Q-switch means 11 (b), shown in FIG. 3, to provide pulsed operation. The Q-switch 11 (b) can be, for example, a rotating cubic mirror having one surface coated so as to effectively 100 percent reflective. The Q-switch is positioned and aligned so that this reflective surface forms one of the optical cavity mirrors.

The glass cylinder 13, in FIG. 1, such as a double-walled Pyrex discharge tube, which is sealed at each end by conventional $CaF_2$, NaCl, or other suitable type Brewster angle windows 14 and 15, is positioned within the optical cavity 10, and contains the ketene gas used in this invention along with effective amounts of electro negative gas or inert buffer gas or gases. Excitation electrodes 16 and 17 made of thin wires, plates or similar elements are shown connected to power supply 18, which can provide an intermittent electric potential between the electrodes of, for example, about 5 pulses/sec. having a duration of about 5 to 10 microseconds and an electric potential range of about 1 to 25 kilovolts. The pulsed electric discharge across the gas causes decomposition breakdown of the $CH_2CO$ gas to $CH_2$: and $C_2H_4$ and vibrationally excited CO laser gas within the tube 13. Other means for supplying excitation to initiate decomposition of ketene, and to form an active laser medium comprising CO* from the ketene gas, can be substituted for the electrical initiation means, for example photolytic, nuclear or thermal excitation means.

The gas mixture 19, containing from very small effective amounts to about 760 Torr $CH_2CO$ active gas; optionally, recirculated cooled CO; up to about 4 Torr active electronegative gases such as $O_2$ and/or $SO_2$; and large effective amounts of $SF_6$, He, Ne, Ar, Kr, Xe or other suitable inert buffer gases, is introduced into the laser cavity through inlet 20, and flows through the cylinder 13 within the laser cavity 10 and between the reflective means. A preferred mixture would contain about 2 to 5 Torr $CH_2CO$ gas, about 0.2 to 1 Torr $O_2$ active electro negative gas and about 20 to 100 Torr $SF_6$ gas. A vacuum exhaust pump 21 or other suitable exhaust means is connected to the discharge tube at outlet 22 through a suitable control valve, to exhaust the additive gases and the chemical gases produced by $CH_2CO$ gas decomposition. The gas pumping rate can be, for example, about 35 liters/min. for a discharge tube of about one meter in length with about a 40 mm. bore.

Cooling means 23 can be used in this type laser apparatus, where for example a supply of coolant, such as for example Freon-dry ice or cold water, at 24 is used to provide operating temperatures in the resonant laser cavity between about 150°K to 400°K. A portion of the exhaust CO gas from outlet 22 may be recycled by any suitable means and mixed with the ketene and other gases introduced through inlet 20.

Output laser beam 25 results from adjusting the mirrors of the optical resonant laser cavity, to produce stimulated emission and an output beam which is laser energy having a wavelength between about 4.7 and 5.9 micrometers.

We claim:

1. A CO chemical laser, capable of producing stimulated laser emission, comprising:
   a. an enclosure;
   b. a gas comprising the ketene $CH_2CO$;
   c. means for introducing said gas into the enclosure;
   d. means for supplying excitation energy to the gas comprising the ketene $CH_2CO$, to form an active laser medium comprising vibrationally excited CO gas by decomposition of the ketene $CH_2CO$;
   e. means for stimulating the emission of radiation from said active laser medium.

2. The CO chemical laser of claim 1 wherein the gas introduced into the enclosure also includes at least one other gas, acting as an inert buffer gas, selected from the group consisting of $SF_6$, He, Ne, Ar, Kr and Xe.

3. The CO chemical laser of claim 1 means for stimulating comprises Q-switching means.

4. The CO chemical laser of claim 2 containing means for exhausting the gases from the enclosure, wherein the partial pressure of the ketene $CH_2CO$ gas within the enclosure is between about 0.1 to about 760 Torr, and the temperature in the laser cavity is between about 150°K to about 400°K.

5. The CO chemical laser of claim 4 wherein the gas introduced into the enclosure also includes at least one electronegative gas selected from the group consisting of $O_2$ and $SO_2$ up to about 4 Torr.

6. The CO chemical laser of claim 4, wherein said means for stimulating comprises an optical resonant cavity, the excitation energy is supplied to the gas by an electric discharge across the gas, and the gas flows axially through the enclosure.

7. The CO chemical laser of claim 5, wherein the gas introduced into the enclosure consists essentially of about 2 to about 5 Torr the ketene $CH_2CO$, about 0.2 to about 1 Torr electronegative gas selected from the group consisting of $O_2$ and $SO_2$ and mixtures thereof and about 20 to about 100 Torr of inert buffer gas selected from the group consisting of $SF_6$, He, Ne, Ar, Kr, Xe and mixtures thereof.

8. The CO chemical laser of claim 6 also containing means to recirculate CO gas into the enclosure.

9. A CO chemical laser, capable of producing stimulated laser emission, comprising:
   a. an enclosed optical resonant cavity;
   b. a gas comprising the ketene $Ch_2CO$ in said cavity; and
   c. means for supplying energy to the gas comprising the ketene $CH_2CO$, to decompose $CH_2CO$ and form an active laser medium comprising vibrationally excited CO gas.

10. The CO chemical laser of claim 9 wherein the gas in the optical resonant cavity also includes at least one other gas, acting as an inert buffer gas, selected from the group consisting of $SF_6$, He, Ne, Ar, Kr, and Xe, and the optical resonant cavity is formed between reflective means, and the excitation energy is supplied to the gas by an electric discharge across the gas.

* * * * *